United States Patent [19]
Wallace

[11] Patent Number: 4,893,456
[45] Date of Patent: Jan. 16, 1990

[54] TRACTOR WITH SHIFTABLE MOWING DECK

[76] Inventor: Robert H. Wallace, 136 Greenwood Dr., Cumming, Ga. 30130

[21] Appl. No.: 184,114

[22] Filed: Apr. 21, 1988

[51] Int. Cl.[4] .................................................. A01D 34/64
[52] U.S. Cl. ................................ 56/15.5; 56/DIG. 22; 56/6
[58] Field of Search ................. 56/6, 15.5, 7, DIG. 22

[56] References Cited

U.S. PATENT DOCUMENTS

| | | | |
|---|---|---|---|
| 3,508,384 | 4/1970 | Madre | 56/15.5 |
| 3,650,098 | 3/1972 | Folk | 56/15.5 |
| 4,195,860 | 4/1980 | Helams | 56/15.5 |
| 4,468,917 | 9/1984 | Mellgren | 56/15.5 |
| 4,470,244 | 9/1984 | Leigers | 56/15.5 |

*Primary Examiner*—John Weiss
*Attorney, Agent, or Firm*—Jones, Askew & Lunsford

[57] ABSTRACT

A mowing machine having a cutting path laterally positionable with respect to the path on which the mowing machine travels. A cutting deck is suspended beneath a tractor or other vehicle, on lateral tracks permitting a range of lateral movement across the longitudinal centerline of the tractor. Displacing the cutting deck from the normal position centered on the centerline displaces the cutting path to one side of the tractor, permitting mowing beneath obstacles or along other areas inaccessible to the mowing machine.

6 Claims, 2 Drawing Sheets

TRACTOR WITH SHIFTABLE MOWING DECK

FIELD OF INVENTION

This invention relates in general to mowing machines, and relates in particular to mowing machines mounted on vehicles such as tractors or the like.

BACKGROUND OF THE INVENTION

Power-driven mowing machines are extensively used for cutting grass in commercial, home, and institutional applications. These mowing machines typically include a tractor-like motorized vehicle, with one or more mowers carried by the vehicle. Rotary lawn mowers carried by tractors or the like frequently are called "cutting decks", and each cutting deck generally mows a swath along a path determined by the travel of the tractor itself. Where the cutting deck is mounted beneath the tractor or otherwise is substantially in line with the longitudinal axis of the tractor, the cutting path is substantially aligned with the travel path of the tractor.

The maneuverability of tractor-carried mowing decks depends on the maneuverability of the tractor, and on the mounting location of the mowing deck. The width of the swath cut by the mowing deck in many mowing machines is substantially the same as the track width of the tractor or other vehicle carrying the mowing machine, which prevents mowing areas that the tractor cannot safely or conveniently traverse. For example, such mowing machines cannot mow under shrubbery, and usually cannot mow particularly close to ditches or other obstacles on the area being mowed. Mowing grass atop sea walls present similar problems to prior-art mowing machines, where driving the tractor up to the edge of the sea wall is extremely hazardous.

Previously, the grass remaining uncut beneath shrubbery and other obstacles to tractor-mounted mowing machines was cut by hand mowers or line trimmers. This arrangement is expensive and time-consuming. Side-deck mowers are known and are useful in some applications, but those mowers are much more expensive than center-mounted mowers and still may not be capable of cutting close to obstacles in some situations.

SUMMARY OF THE INVENTION

It is an object of the present invention to provide an improved mowing machine.

It is another object of the present invention to provide a tractormounted mower with a laterally-shiftable mowing deck.

It is yet another object of the present invention to provide a mowing machine capable of selectively repositioning the cutting path relative to the travel path of the mower.

It is still a further object of the present invention to provide a tractor-mounted mower capable of laterally shifting the mowing deck while the mower is underway.

Stated in general terms, the present invention includes a tractor or other vehicle which traverses the ground along a selected path, and a mowing device supported by the vehicle to undergo selective lateral movement relative to the path along which the vehicle moves. The swath cut by the mowing device is thus selectively displaced laterally relative to the path of the vehicle, and this selective lateral displacement preferably extends outside the tires on at least one side of the tractor. The tractor with the mowing device thus laterally extended can mow beneath shrubbery or other overhanging or hazardous obstacles, while the tractor itself travels alongside those obstacles.

Stated somewhat more particularly, the mowing deck of the present invention is supported for lateral movement relative to the tractor or other vehicle. Lateral movement support is provided in a preferred embodiment by tracks extending laterally relative to the mowing deck. coextensively with the range along which the mowing deck laterally moves. Guide members movably engage these lateral tracks such that the guide means and the tracks together provide support for the mowing deck while permitting selective lateral movement of the mowing deck in operation.

The objects and nature of the present invention will become more readily apparent from the following description of a preferred embodiment.

DETAILED DESCRIPTION OF PREFERRED EMBODIMENT

Figure 1:
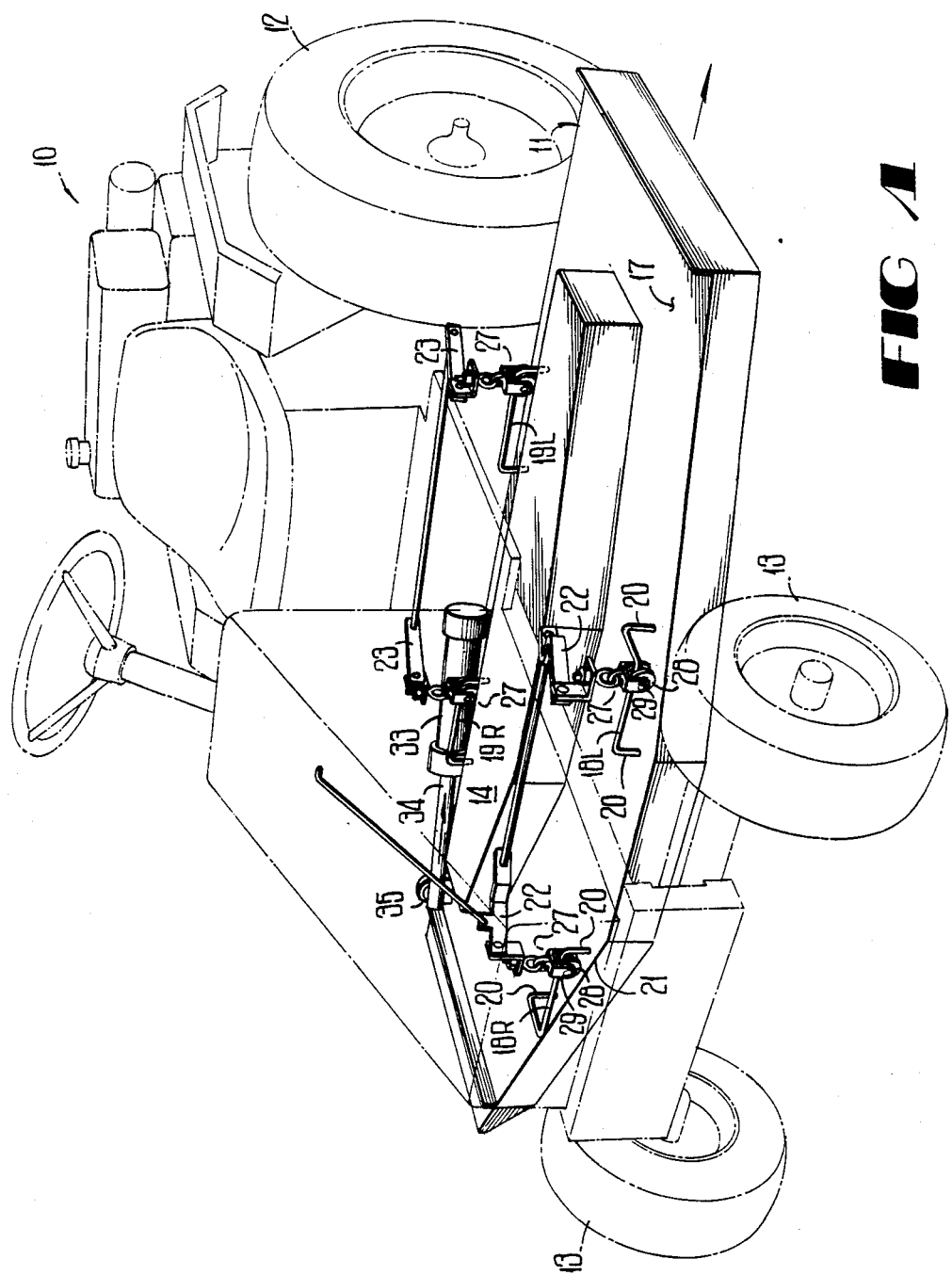
FIG. 1 is a pictorial view showing a tractor in outline view, equipped with a shiftable mowing deck according to a preferred embodiment of the invention.

Turning first to FIG. 1, there is shown generally at 10 a tractor equipped with a mowing deck 11 mounted underneath the midsection of the tractor, between the rear wheels 12 and the front wheels 13. The tractor 10 itself, except for modifications necessary to accommodate the shiftable mowing deck as described hereinafter, may be a conventional utility tractor known in the art. The mowing deck 11 contains a plurality of rotary mowing blades (not shown) driven by a suitable connection to the power takeoff of the tractor 10. A safety shroud 14 covers part of the drive connection for the mowing deck.

The mowing deck 11 has an upper surface 17 below which the mowing blades are mounted. This surface 17 is usually fabricated from one or more steel sheets, and spans the entire width of the mowing deck. The path cut by a conventional mowing deck is generally about as wide as the maximum track width of the tractor and is laterally aligned along the longitudinal center line of the tractor, so that the tractor rear wheels 12 lie in the path of the mower and do not crush unmown grass. The width of the present mowing deck 11 likewise is substantially the same as the track width of the tractor 10, although that width is not a limiting factor for the present invention.

Attached to the upper surface 17 of the mowing deck 11 are the front lateral tracks 18R, 18L and the rear lateral tracks 19R, 19L. The lateral tracks 18R and 18L are respectively at the right and left front corners of the mowing deck surface 17, and the lateral tracks 19R, 19L correspondingly are at the right left rear corners of the upper surface. These front and rear lateral tracks, in combination with other elements of the apparatus, provide vertical support for the mowing deck 11 and also permit selective lateral displacement of the mowing relative to the tractor 10.

The ends of the two front lateral tracks 18R and 18L each are mounted on a pair of supports 20 extending forwardly from the front edge 21 of the mowing deck 11, so as to position the respective front lateral tracks more nearly beneath the corresponding front links 22 associated with the conventional power-lifting system of the tractor 10. The two rear lateral tracks 19R and 19L likewise are preferably positioned beneath the rear links 23, and the rear lateral tracks are secured directly to the upper surface 17 of the mowing deck and are spaced upwardly a short distance above that upper surface. All four lateral tracks 18R, 18L and 19R, 19L take the form of rails having a circular cross-section in the present embodiment, although those skilled in the art will appreciate that other configurations are possible. Details of the power lifting system operating the links 22 and 23 are known to those skilled in the art.

Attached to each front link 22 and rear link 23 of the vertical lifting mechanism are track supports 27, which depend downwardly from the links and engage the respective lateral tracks attached to the mowing deck 11. Each track support 27 comprises a roller 28 mounted at the open end of a yoke 29, each roller engaging the underside of a corresponding lateral track 19 18R, 18L and 19R, 19L.

It should now be apparent that the track supports 27 support the four lateral tracks 18, 19, 18R, 18L and 19R, 19L, and the mowing deck 11 suspended beneath the track supports, for translational movement in the lateral direction relative to the longitudinal axis of the tractor 10. The range of this lateral movement depends on the length of the lateral tracks 18 and 19. The particular lateral position of the mowing deck 11 along the range of possible movement is determined by an actuator such as the hydraulic cylinder 33 connected to the tractor 10. The piston rod 34 of the cylinder 33 attaches to the upper surface 17 of the mowing deck 11 at a location 35 chosen to maximize the lateral extent of the piston stroke, keeping in mind the practical limitations imposed on the location of the hydraulic cylinder by the right-side tractor rear wheel 12 and other components of the tractor and the mowing deck. The hydraulic cylinder 33 is connected in the conventional manner to the hydraulic system of the tractor 10, so that the hydraulic cylinder is operable by the tractor driver.

Figure 2:
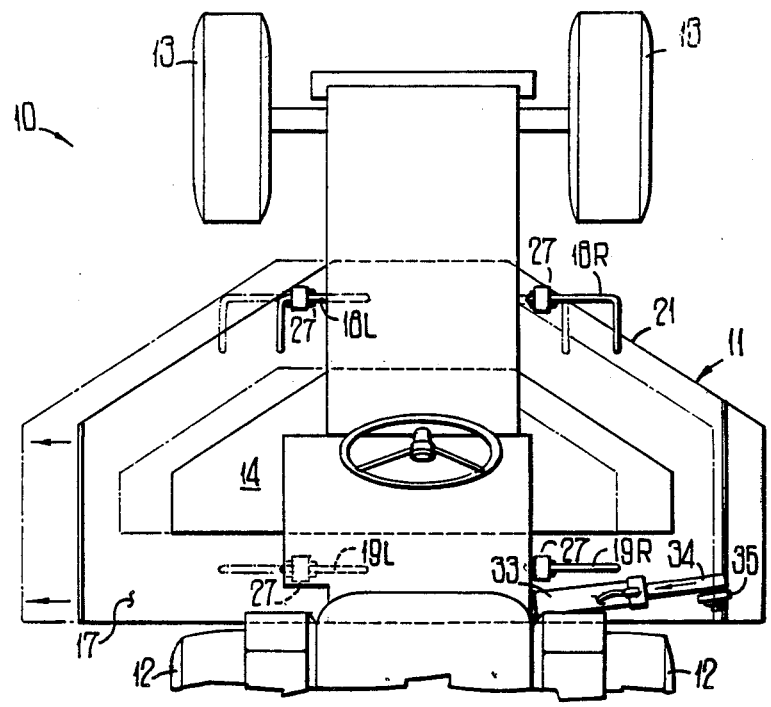
FIG. 2 is a plan view of the disclosed embodiment, illustrating the mowing deck in solid lines centered with respect to the tractor, and in broken lines shifted laterally with respect to the tractor.

The operation of the present embodiment is now described. With the piston rod 34 of the cylinder 33 fully extended as shown in FIG. 2, the mowing deck 11 is at its right-most position and is substantially centered relative to the centerline of the tractor 10. In that position of the mowing deck 11, the tractor-mounted mower cuts a path substantially coextensive with the track of the tractor, and thus functions in the conventional manner. It is anticipated that the mowing deck 11 would remain in the centered position, as shown in solid lines in FIG. 2, much of the time while the mower is in use.

Whenever it is desired to mow beneath shrubbery or other obstacles to one side of the tractor, the operator actuates the hydraulic cylinder 33 to retract the piston rod 34, thereby laterally moving the mowing deck 11 to the operator's left. This laterally-shifted position of the mowing deck is illustrated by broken lines in FIG. 2. This lateral movement causes the left side of the mowing deck to extend substantially beyond the left side of the tractor, effectively shifting the mowing path in that direction relative to the path being traveled by the tractor. The mower operator thus can drive the tractor alongside an obstacle such as shrubbery or the like, and at the same time mow beneath that obstacle in a manner heretofore not possible with tractor-mounted mowing machines of the prior art. After mowing beneath the obstacle, the operator can then laterally reposition the mowing deck on the fly, without interrupting either the operation of the mowing deck or the forward travel of the tractor. In the case of mowing along the top of a sea wall, the operator can guide the tractor at a safe distance from the edge of the sea wall and laterally extend the mowing deck to cut the grass at the edge of the sea wall, safely beyond the track of the tractor.

The range of lateral movement for the mowing deck in the present embodiment extends from a centered position to a leftwardlyextended position, but those skilled in the art will understand that other ranges are possible. For example, the lateral extension of the mowing deck can be reversed to a rightward extension, instead of the leftward extension disclosed. It is also considered within the scope of the present invention to make the mowing deck 11 laterally repositionable either to the left or to the right of the tractor, at the control of the operator. This bilateral extension of the mowing deck would allow the operator to cut beneath obstacles and the like on either side of the tractor, without always approaching the obstacle from the same side of the tractor.

It should also be understood that the foregoing relates only to a disclosed embodiment of the present invention, and that numerous changes and modifications therein may be made without departing from the spirit or scope of the invention as defined in the following claims.

I claim:

1. Mowing machine comprising:
   a vehicle including front wheels and rear wheels for traversing a selected path;
   mowing means supported by the vehicle at a longitudinal location between the front and rear wheels, and operative to mow a swath as the vehicle travels along the path;
   motive means operatively associated with the mowing means to shift the mowing means laterally between a first lateral position and a second lateral position longitudinally located between the front and rear wheels, relative to the selected path;
   the mowing means in the first lateral position being substantially centered relative to the vehicle wheels, and in the second lateral position extending laterally beyond the vehicle wheels alongside the vehicle to displace the mowing swath relative to the path traveled by the vehicle.

2. A mowing machine as in claim 1, further comprising:
   means operative to adjust the elevation of the mowing means independently of the motive means laterally shifting the mowing means,
   whereby both the elevation and the lateral position of the mowing means are selectably and independently shiftable.

3. A mowing machine for use with a vehicle having front and rear wheels for traveling along a ground path, comprising:
   a mowing deck for attachment to the vehicle and providing a cutting path normally at a first lateral position relative to the vehicle;

elevating means associated with the vehicle and the mowing deck for selectively raising and lowering the mowing deck relative to the ground;

guide means associated with the vehicle and the mowing deck at a longitudinal location between the front and rear wheels of the vehicle for defining a range of selective lateral travel for the mowing deck relative to the vehicle, so that the lateral position of the mowing deck relative to the vehicle is selectively movable to laterally shift the path of the mowing deck relative to the path traveled by the vehicle;

motive means selectively operative to shift the mowing deck laterally along the guide means and thereby laterally displace the cutting path to a second lateral position relative to the path traveled by the vehicle; and one of the lateral positions laterally disposing the cutting path at least partially outside the wheels of the vehicle, whereby the cutting path of the mowing machine is selectively displaceable for mowing outside of the vehicle wheels.

4. A mowing machine comprising:

a vehicle having wheels for traveling along the ground;

a mowing deck associatd with the vehicle and providing a cutting path normally at a first lateral position relative to the vehicle;

elevating means associated with the vehicle and the mowing deck for selectively raising and lowering the mowing deck relative to the ground;

guide means associated with the vehicle and the mowing deck for defining a range of selective lateral movement for the mowing deck relative to the vehicle, so that the lateral position of the mowing deck relative to the vehicle is movable to laterally shift the path of the mowing deck relative to the path traveled by the vehicle;

said guide means comprising a lateral support member associated with the mowing deck;

a bearing member associated with the elevating means and laterally movably engaging the lateral support member so as to provide vertical support for the mowing deck while permitting lateral displacement of the lateral support member and the mowing deck associated therewith;

motive means selectively operative to shift the mowing deck laterally along the guide means and thereby laterally displace the cutting path to a second lateral position relative to the vehicle wheels; and one of the lateral positions laterally disposing the cutting path at least partially outside the wheels of the vehicle, whereby the cutting path of the mowing machine is selectively displaceable for mowing outside of the vehicle wheels.

5. A mowing machine comprising:

a vehicle having wheels for traveling along the ground;

a mowing deck associated with the vehicle and providing a cutting path normally at a first lateral position relative to the vehicle;

elevating means associated with the vehicle and the mowing deck for selectively raising and lowering the mowing deck relative to the ground;

guide means associated with the vehicle and the mowing deck for defining a range of selective lateral movement for the mowing deck relative to the vehicle, so that the lateral position of the mowing deck relative to the vehicle is movable to laterally shift the path of the mowing deck relative to the path traveled by the vehicle;

said guide means comprising a member attached to one of the mowing deck and the elevating means, and defining a movement track extending along the range of lateral movement;

a follower member attached to the other of the mowing deck and the elevating means, and movably engaging the movement track so as to provide vertical support for the movement track while permitting lateral displacement of the mower deck;

motive means selectively operative to shift the mowing deck laterally along the guide means and thereby laterally displace the cutting path to a second lateral position relative to the vehicle wheels; and one of the lateral positions laterally disposing the cutting path at least partially outside the wheels of the vehicle, whereby the cutting path of the mowing machine is selectively displaceable for mowing outside of the vehicel wheels.

6. The mowing machine as in claim 5, wherein the motive means operatively engages the mowing deck to selectively displace the mowing deck within the range of lateral movement.

* * * * *